United States Patent [19]

Park

[11] Patent Number: 5,455,864
[45] Date of Patent: Oct. 3, 1995

[54] ENCRYPTED PAGING MESSAGE TRANSMISSION

[75] Inventor: Daniel J. Park, Aloha, Oreg.

[73] Assignee: Seiko Communications Holdings N.V., Antilles

[21] Appl. No.: 382,838

[22] Filed: Feb. 2, 1995

Related U.S. Application Data

[63] Continuation of Ser. No. 124,285, Sep. 20, 1993, abandoned.
[51] Int. Cl.⁶ ..................................................... H04K 1/00
[52] U.S. Cl. ........................... 380/43; 380/50; 340/825.44
[58] Field of Search .................................. 380/37, 41, 42, 380/43, 49, 50, 52, 53; 340/311.1, 825.44

[56] References Cited

U.S. PATENT DOCUMENTS 4,783,654  11/1988  Ichikawa ............................ 340/825.44
5,150,954  9/1992  Hoff ..................................... 340/825.44
5,283,832  2/1994  Lockart, Jr. et al. ...................... 380/49

FOREIGN PATENT DOCUMENTS 404127725  4/1992  Japan .......................................... 380/9
2155676  9/1985  United Kingdom .............. 340/825.44

Primary Examiner—Tod R. Swann
Attorney, Agent, or Firm—Elmer Galbi

[57] ABSTRACT

A method and apparatus for paging message encryption and decryption is shown and described. Paging messages may be encrypted at their source or by the paging system and delivered by radio signal in secure fashion to a paging system for delivery to a remote radio signal receiving paging device. Advantageously, certain paging device hardware and software resources are used to both detect transmission errors and to decrypt paging messages.

4 Claims, 4 Drawing Sheets

ENCRYPTED PAGING MESSAGE TRANSMISSION

This application is a continuation of application Ser. No. 08/124,285, filed Sep. 20, 1993 which is now abandoned.

BACKGROUND OF THE INVENTION

The present invention relates generally to telecommunication equipment and systems, and particularly to a method of secure message delivery from a message source to a paging device.

Paging devices are evolving into information terminals, providing more information then merely a "beep" or a telephone number to be called in response to the page. In particular, paging devices can display alpha-numeric messages bearing a variety of message types. Also, by prearrangement with a message source, meaningful information can be encoded into the form of a telephone number or given pattern of digit presentation to convey, by such prearrangement, meaningful information beyond a telephone number to be called. Security with respect to information delivered to a paging device is desirable because paging devices can receive for display and storage confidential information, e.g. bank account balance information or a variety of other information the receiver considers confidential.

Security with respect to message display and device access in a paging device has been proposed wherein the user enters a password before he paging device displays certain designated messages, or before the device exits a "lockout" mode. For example, see U.S. Pat. No. 5,146,217 issued Sep. 8, 1992 to Holmes et al and entitled SELECTIVE CALL RECEIVER HAVING CONFIDENTIAL MESSAGE READ PROTECTION. Unfortunately, such arrangement does not protect the confidentiality of messages when broadcast by radio signal to the paging device. By obtaining radio receiving and data processing equipment to comply with the broadcast protocol of a given paging system, an adversary can simply eavesdrop on the radio signal broadcast and obtain confidential information.

Paging devices are generally small, miniaturized radio receiving devices including, to the extent possible in such miniaturized devices, certain memory resources and programmable processing elements. In fact, paging devices have been successfully implemented in a wristwatch according to a highly miniaturized, highly power efficient architecture. As may be appreciated, any features added to a paging device require hardware and software resources. Such hardware and software resources, however, are not always easily incorporated into highly miniaturized electronic devices, e.g., such as in a wristwatch pager. Accordingly, any feature incorporated into a paging device desirably makes minimal use of additional hardware and software resources, or, if at all possible, makes use of pre-existing hardware and software resources.

The subject matter of the present invention addresses the problem of security in a paging system by providing a mechanism for secure message management with minimal additional use of existing hardware and software resources.

SUMMARY OF THE INVENTION

In accordance with the present invention, paging messages are encrypted prior to transmission by radio signal. The user of the paging device, upon receiving an encrypted message, can enter a key to decrypted the message and thereby recover hidden information. An adversary monitoring the radio signal broadcast cannot easily recover the information without the decryption key and knowledge of the encryption and decryption algorithms.

According to one embodiment of the present invention, a message source includes programmable data processing ability and a direct data link to the paging system. The message source, by use of its processing ability, applies an encryption algorithm to a plaintext message prior to submission to the paging system. Access to the plaintext version of the message is thereby not available by monitoring communication links between the message source and the paging system, or, by monitoring a radio signal transmitting the paging information to a paging device.

According to one aspect of the present invention, decryption algorithms may be performed by the same hardware and software resources also providing error detection functions. In this manner, the paging device of the present invention makes efficient use of pre-existing such hardware and software resources when incorporating cryptographic features.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
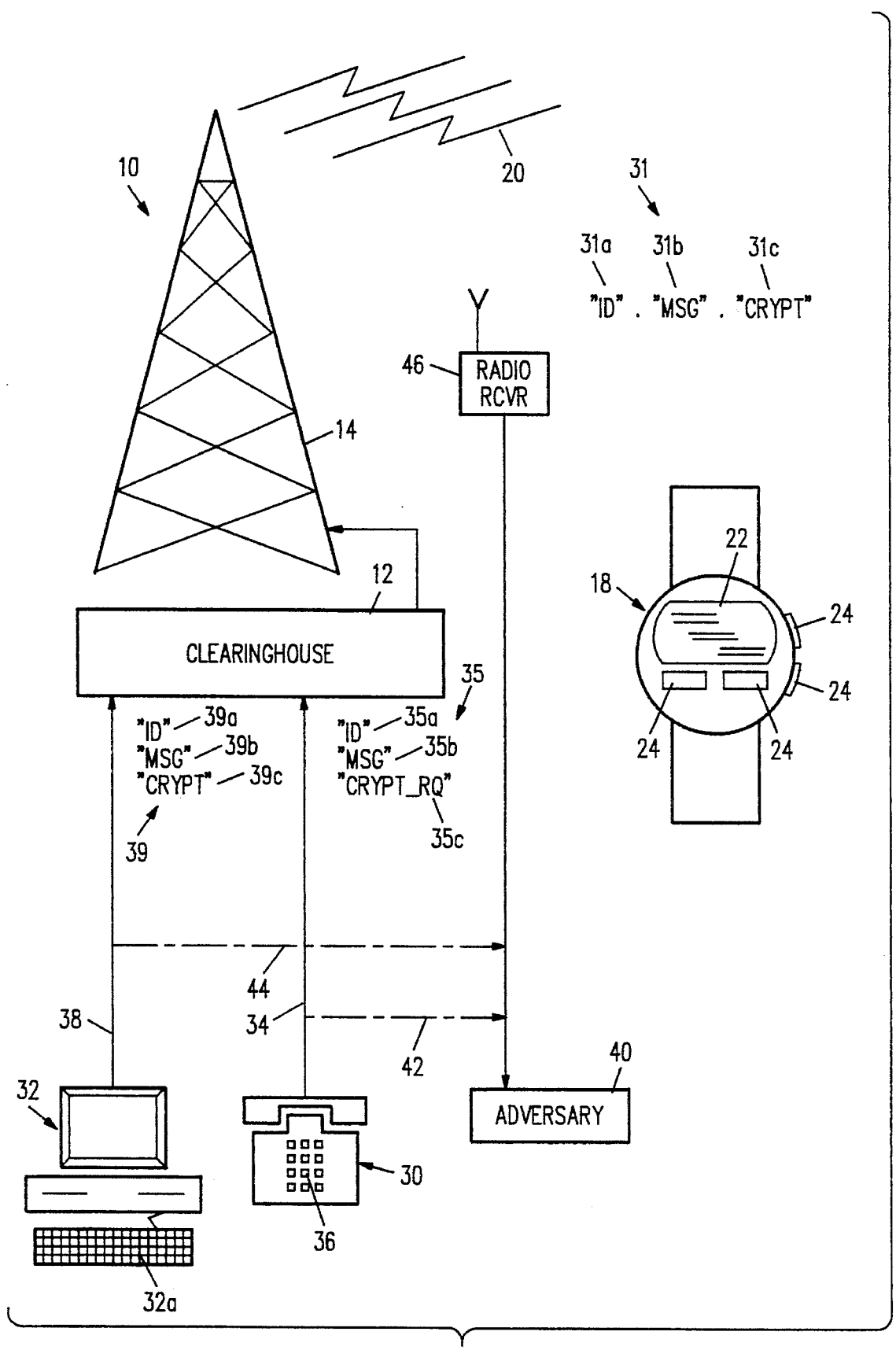
FIG. 1 is a schematic illustration of a paging system illustrating two types of message sources, radio broadcast of paging messages to a paging device, and monitoring of data of the paging system by an adversary attempting to eavesdrop.

FIG. 1 illustrates generally a paging system 10 including a clearinghouse 12 receiving paging messages from message sources, a radio signal transmitting facility 14 coupled to clearinghouse 12 by way of data link 16, and a highly moniturized wristwatch paging device 18 receiving paging messages by way of broadcast radio signal 20 as provided by clearinghouse 12 via transmission facility 14. Each paging device 18 includes a display 22 and control buttons 24, individually 24a–24d. As may be appreciated, each paging device 18 includes processing components and hardware resources for receiving information from radio broadcast 20, monitoring user manipulation of buttons 24, and presenting information on display 22.

In accordance with the present invention, paging message sources submit encrypted information to clearinghouse 12, or in a relatively less secure arrangement clearinghouse 12 can encrypt paging messages prior to transmission. Radio signal 20 thereby carries encrypted information, and is therefore more secure against unauthorized eavesdropping relative to "plaintext" radio signal 20 transmission. Thus, message sources should be provided with appropriate data processing ability and, by pre-arrangement with the user of paging device 18, use a pre-arranged encryption key whereby the paging device 18 may derive meaningful information from the message source, yet enjoy security with respect to such information in transit to the paging device 18. In an arrangement where clearinghouse 12 encrypts messages for transmission, the user of paging device 18 would necessarily provide to the paging system 10 a key to be used when encrypting messages. Thus, whether messages are encrypted at the source or encrypted by the paging system 10, security is provided in the radio signal 20 information.

Paging system 10 receives paging messages originating from a variety of message sources. As illustrated in FIG. 1, two such sources include a telephone 30 and a personal computer 32. The telephone 30 couples to clearinghouse 12 by way of telephone voice line 34. Under such arrangement, clearinghouse 12 provides to telephone 30 voice prompts and, in response, the user of telephone 30 manipulates the keys 36 of telephone 30 to identify a particular one of paging devices 18 and generate a paging message therefor. Information carried on telephone voice line 34 is dual tone multi-frequency (DTMF) signals generated in the context of voice prompt interaction. Methods exist for generating alpha-numeric messages by way of keys 36 of telephone 30. Unfortunately, however, a conventional telephone 30 does not include sufficient processing ability to encrypt paging messages, as does personal computer 32. Thus, a message enroute to clearinghouse 12 via telephone voice line 34 is "plaintext" and does not enjoy the security of encryption. A message generated at the personal computer 32, however, can be encrypted by computer 32 prior to submission to clearinghouse 12 making the information secure while in transit via paging system 10.

While the telephone 30 cannot encrypt a message as submitted to clearinghouse 12, clearinghouse 12 can encrypt a message in response to a request for such process by the user of telephone 30 or in response to a request by the user of the destination paging device 18. Thus, while the telephone line 34 will likely carry "plaintext" information in the form of DTMF signals, the clearinghouse 12 can encrypt such information as it appears in radio broadcast 20.

Thus, by way of voice prompt interaction and DTMF signals, the user of telephone 30 delivers to clearinghouse 12 a destination pager identification 35a, a message string 35b containing a message to be submitted to the specified destination paging device 18, and an encryption request flag 35c indicating that the associated message string 35b is or is not to be encrypted by clearinghouse 12 prior to transmission in radio signal 20.

Personal computer 32 includes a modem coupled to the clearinghouse 12 by way of telephone data line 38. Personal computer 32, as a message source, is more versatile with respect to generating alpha-numeric messages then that of telephone 30. For example, the user of personal computer 32 can generate alphanumeric messages through use of keyboard 32a and, by appropriate programming of computer 32, submit such alpha-numeric messages to clearinghouse 12 according to a given paging message submission convention. For example, one defacto standard is known as the Personal Communications Industry Association "Telocator AlphaProtocol" (TAP). Thus, under the TAP standard, the operator of personal computer 32 can submit character strings constituting paging messages, including encrypted messages, to the paging system 10 for delivery to a given paging device 18.

Personal computer 32 delivers by way of telephone line 38 text strings 39 appropriately formatted according to, for example, the TAP standard, for further processing by clearinghouse 12. Thus, an identification string 39a specifies a given paging device 18, a message text string 39b presents the message, i.e., alpha-numeric information, to be delivered to the specified paging device 18, and, in accordance with the present invention, a flag 39c indicates whether the message string 39b is encrypted as provided by computer 32. Clearinghouse 12 then processes the text strings 39 to produce a radio signal 20 transmitted data packet 31 including representation of a paging device address as a function of identification 39a, a message string 31b, and an encryption bit 31c. The identification string 39a provided by computer 32 may or may not be literally represented in the identification 31a transmitted by radio signal 20, but would have a direct one to one relationship thereto. As may be appreciated, clearinghouse 12 reacts to the encryption flag 39b provided by computer 32 by appropriately setting the encryption bit 31c of data packet 31. Thus, if flag 39c indicates the associated message 39b is encrypted, then clearinghouse 12 will set the encryption bit 31c to indicate a need to decrypt the received message string 31c.

Personal computer 32 may be operated by, for example, a banking institution and used to generate paging messages for its banking customers. In this manner, the paging device 18 becomes a remote information terminal receiving information generated by the banking institution. In particular, the personal computer 32 can be used to generate bank account balance information for the user of paging device 18. Under such arrangement, the banking institution programs personal computer 32 to submit information identifying the paging device 18 in conjunction with the banking account balance to clearinghouse 12 by way of data telephone line 38. Because such information may be considered private and confidential to the user of paging device 18, one may desire to avoid eavesdropping with respect to the telephone line 38 and radio broadcast 20.

An adversary 40 within the domain of paging system 10 may be eavesdropping or monitoring telephone lines 34 and 38 by way of unauthorized telephone links 42 and 44, respectively. More likely, however, adversary 40 would use radio signal receiving equipment 46 to monitor the radio signal 20, it being more difficult to obtain unauthorized access to the telephone lines 34 and 38. In either case, a greater level of message security is provided under the present invention as compared to "plaintext" radio signal transmission.

Because paging devices 18 are small highly miniaturized devices, efficient use of software and hardware resources is important. In particular, devoting excess hardware or software resources to message decryption can degrade other aspects of the paging devices 18, e.g., increase size, increase cost of manufacture, or increase cost of design. In accordance with one aspect of the present invention, however, the cryptographic algorithms and resources are closely tied to error detection algorithms and hardware for efficient use of software and hardware resources of paging device 18.

Figure 2:
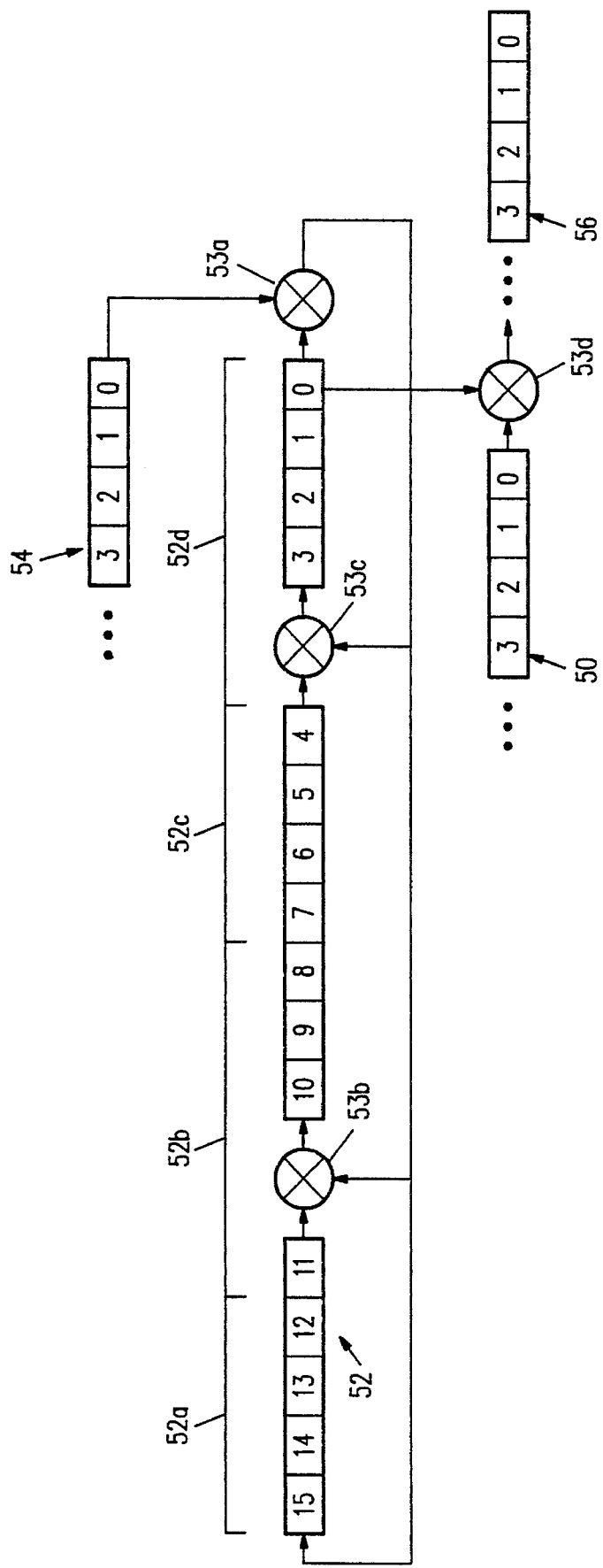
FIG. 2 illustrates an encryption algorithm for paging messages.

FIG. 2 illustrates schematically a cyclic redundancy check (CRC) generator based on the generator polynomial $X^{16}+X^{12}+X^{5}+1$. As may be appreciated by those skilled in the art, such a CRC generator is used by clearinghouse 12 to produce a CRC check word transmitted as part of the message 31b, i.e., appended thereto. Paging device 18 uses the appended CRC check word to verify information received.

When the paging device 18 receives the message 31b with appended CRC check word, paging device 18 also employs a CRC generator to calculate independently a CRC check word and compare its calculated CRC check word to the CRC check word appended to the message 31b. If the CRC check words, i.e., the one produced by clearinghouse 12 and transmitted to paging device 18 and the one calculated independently by paging device 18, match then an error free message is indicated. As may be appreciated, error correcting algorithms may be applied to rectify some detected errors if possible. Also, paging system 10 transmission protocol may include multiple transmissions of the same message, and in the event of detected message error, paging device 18 may seek subsequent transmissions of the same message for collecting or building an error free paging message.

The CRC generator of FIG. 2 includes a 16-bit register 52. A second register 54 holds the message data for which a CRC check word is to be calculated. Both of registers 52 and 54 are shift registers permitting shifting of data towards the least significant bit of each register. An exclusive OR function 53a receives the least significant bit of each of registers 52 and 54 and applies the result to the most significant bit of register 52. Also, an exclusive OR function 53b receives the output of exclusive OR function 53a and the bit value taken from bit eleven of register 52, the result of exclusive OR function 53b being placed in bit ten of register 52. Similarly, an exclusive OR function 53c receives the output of exclusive OR function 53a and the value of bit four of register 52, with the result of function 53c being placed in bit three of register 52.

To produce a CRC check word, register 54 is filled with the message for which a CRC check word is to be calculated and register 52 is filled with all zero bits. The CRC check word is then calculated by sequentially applying the exclusive OR functions 53 and shifting the registers 52 and 54 one bit position toward the least significant bit in accordance with known CRC check word generator operation. After the message of register 54 has been fully shifted through to its least significant bit and the corresponding exclusive OR functions 53 applied, the value then held in register 52 is the CRC check word for that message.

Thus, a CRC generator is a pre-existing hardware and software resource of the paging system, i.e., of clearinghouse 12 and of paging device 18. Under the present invention, it is proposed that the same hardware and software resource may be employed in the encryption and decryption of messages.

It is proposed that personal computer 32 be programmed, or provided with similar hardware, to provide message encryption corresponding to message decryption in the paging device 18. The illustration of the cyclic redundancy check generator of FIG. 2 is representative of that required not only in clearinghouse 12 in transmission of paging messages as part of an error detecting mechanism, but also in the personal computer 32 and clearinghouse 12 for the purpose of encryption.

The following discussion will reference FIG. 2 with respect to encryption performed in the personal computer 32 prior to submitting a paging message to clearinghouse 12. The same procedure is applied by clearinghouse 12 when a message is to be encrypted by clearinghouse 12. In FIG. 2, a register 50 holds a plaintext bit sequence to be secured by encryption. Register 52 holds four four-bit BCD digits as a prearranged encryption key applied during the encryption process, the key being known by the user of paging device 18. Register 54 drives the encryption process. Register 54 may hold, for example, a predetermined sequence of four-bit digit representations of the numbers 1 through 18, least significant bit first, i.e., 1000 0100 1100 . . . 1000 0100 . . ., as a mechanism for driving the encryption algorithm. An exclusive OR function 53d receives the value of the least significant bit of register 52 and the least significant bit of register 50, with the result of exclusive OR function 53d being shifted into an output register 56.

Once the encryption key is loaded in register 52, the predetermined bit pattern is loaded in register 54, and the plaintext message is loaded in register 50, the algorithm of encryption is executed to fill a register 56 with an encrypted version of the plaintext message.

The encryption algorithm proceeds generally as follows. The least significant bit of register 50 is exclusively ORed with the least significant bit of register 52. The result of this exclusive OR function is an encrypted bit shifted into register 56. The least significant bit of register 54 is exclusively ORed with the least significant bit of register 52, with the result being shifted into the most significant bit of register 52, thereby driving register 52 into its next state, i.e., presenting a new bit at its least significant bit position. Register 54 is then shifted one bit toward its least significant bit to present a new bit at its least significant bit position. Register 50 is then shifted one bit toward its least significant bit for encryption of the next message bit, and if the message held in register 50 is not yet fully shifted through to the least significant bit then the process repeats until all bits of the plaintext message loaded into register 50 have been encrypted and shifted into register 56.

Thus, personal computer 32 applies the encryption method illustrated in FIG. 2 to generate an encrypted version of the message to be delivered to paging device 18. The encrypted message may be otherwise manipulated as ordinary messages by system 10, but would include the encryption bit 31c in the transmitted message packet 31 to indicate the message is a secure or encrypted message and requires decryption by paging device 18 to recover information therefrom.

As may be appreciated, clearinghouse 12 can apply a similar encryption algorithm to messages received from telephone 30 following a request, i.e., flag 35c, (FIG. 1) by the user of telephone 30 that the message is to be encrypted. The user of telephone 30 could either provide the key value to clearinghouse 12 or clearinghouse 12 could maintain key values for each paging device 18. In either case, clearinghouse 12 would undesirably have access to the key value and may represent a compromise with respect to security of messages originating from telephone 30. Allowing clearinghouse 12 to maintain the key value and not permit the user of telephone 30 access to the key value could allow nonprivileged persons, i.e., persons not knowing the key value to generate encrypted messages for a paging device 18. Furthermore, by arrangement with paging system 10, the user of a paging device 18 can request that messages be automatically encrypted prior to transmission in radio signal 20. In either case, clearinghouse 12 would apply an encryption algorithm such as that described above with reference to personal computer 32 to encrypt the message 31b and set bit 31c as transmitted in radio signal 20. When a paging device 18 receives a message indicated, i.e., by way of encryption bit 31c, as an encrypted message, the paging device 18 must apply a decryption algorithm and decryption key corresponding to the encryption algorithm and encryption key employed in the encryption process.

Figure 3:
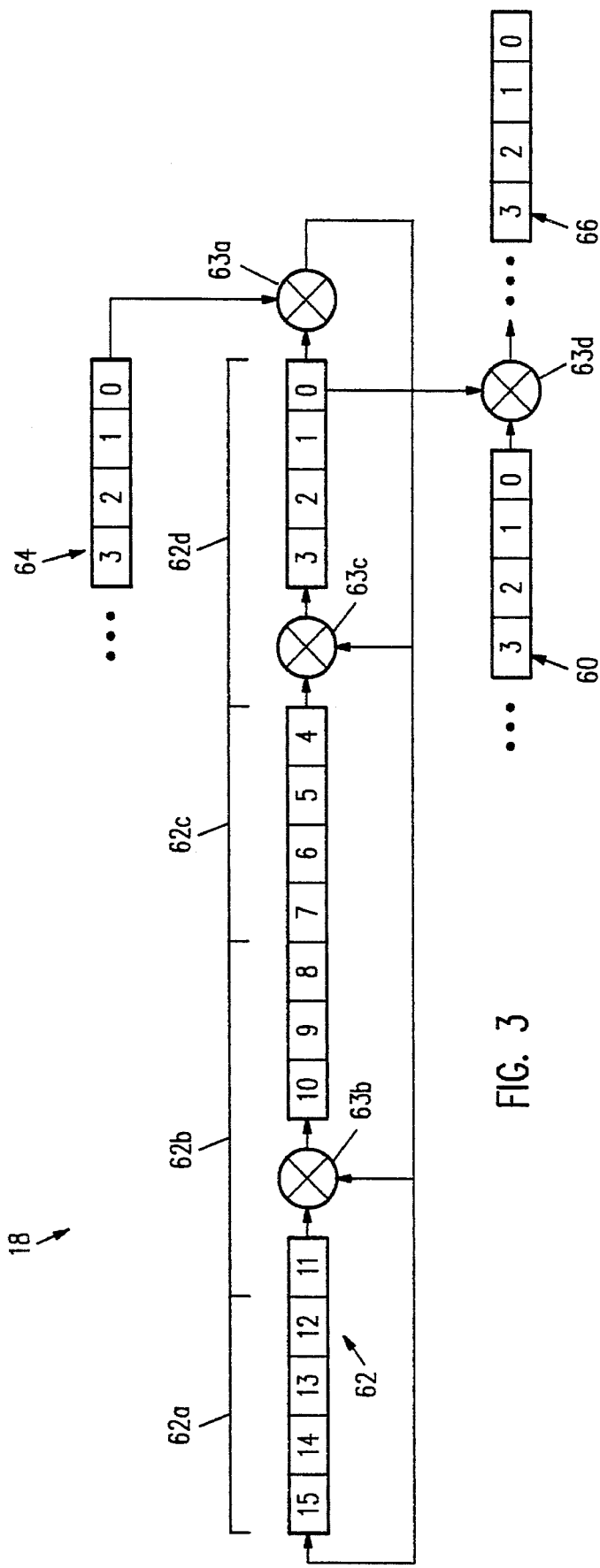
FIG. 3 illustrates a decryption algorithm for the paging device of FIG. 1.

FIG. 3 illustrates a decryption algorithm used by the paging device 18 of FIG. 1. As may be appreciated, the decryption arrangement illustrated in FIG. 3 is virtually identical to that of its error detecting mechanism provided under a cyclic redundancy check method. Thus, the present invention proposes that the error detection circuitry and/or software of each paging device 18 serve a dual function, i.e., for both transmission error detection and for message decryption. The method of decrypting a message received is substantially identical to that described in connection with the encryption process of FIG. 2.

Thus, a register 62 of paging device 18 is loaded with the pre-arranged four digit key value, e.g., the same key value used by the personal computer 32 to encrypt the message, a register 64 holds a predefined bit sequence, e.g., the same predefined bit sequence used by the personal computer 32, and the register 60 holds the encrypted message 31b. Also, the exclusive OR functions 63a–63d in FIG. 3 correspond in position and function to exclusive OR functions 53a–53d of FIG. 2.

The algorithm for filling the register 56 with a plaintext version of an encrypted message 31b is generally as follows. The least significant bit of register 60 is exclusive ORed (XORed) with the least significant bit of register 62. The result of this exclusive OR function is a decrypted bit shifted into register 66. The least significant bit of register 64 is then exclusively ORed with the least significant bit of register 62, with the result being shifted into the most significant bit of register 62. This drives register 62 into its next state, i.e., presents a new bit at its least significant bit position. Register 64 is then shifted one bit toward its least significant bit to present a new bit at its least significant bit position. Register 60 is then shifted one bit toward its least significant bit for decryption of the next message bit. If the encrypted message held in register 50 is not yet fully shifted through to the least significant bit, then the process repeats until all bits of the encrypted message loaded into register 60 have been decrypted and shifted into register 66.

Thus, the same hardware/software resource employed by paging device 18 to calculate a CRC check word may be employed to decrypt a message 31b received. In the case of CRC check word calculation, the message is loaded into register 64, whereas in the case of decryption the message to be decrypted is loaded into register 60. The register 62 holds a calculated CRC check word in the case of error detection, but holds the applied decryption key in the case of decryption. As may appreciated by those skilled in the art, the illustration of FIG. 3 may be implemented in hardware, software, or a combination of hardware and software. In either case, the proposed algorithms of message error detection and message decryption are sufficiently similar to use the same hardware and software resources for both functions. For example, if the resource of FIG. 3 is implemented in hardware of the paging device 18, the same hardware registers are available for both error detection and message decryption by loading appropriate values into appropriate registers and allowing the circuit to execute the same procedure in either case. As a software resource, the registers illustrated may be memory locations with a software function receiving pointers to the memory locations. By passing appropriate pointer values to the software resource the same algorithm may be executed whether it be for the purpose of error detection or message decryption. As a hybrid hardware and software resource, a variety of modifications are possible, in any case significant design and hardware savings are available by dual use of the hardware and software resources.

Figure 4A:
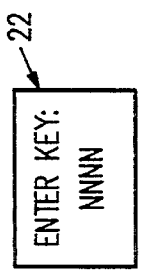
FIGS. 4A and 4B illustrate screen displays of the paging device of FIG. 1 indicating receipt of an encrypted message and a mechanism for entering a decryption key into the paging device.
Figure 4B:
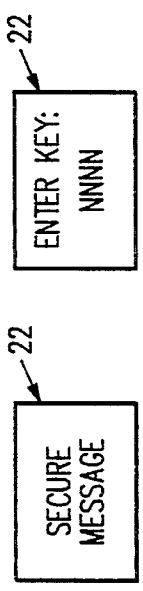

FIGS. 4A and 4B illustrate screens presented on the display 22 of paging device 18 in connection with presenting a secure message to the user of paging device 18, i.e., in response to receiving a packet 31 including an encryption bit 31c indicating an encrypted message 31b. In FIG. 4A, when a secured message is received paging device 18 presents the display "secure message" to indicate to the user that the message has been secured by encryption and a decryption key must be entered. By pressing one of the control buttons 24 the paging device then moves to the screen illustrated in FIG. 4B prompting the user for entry of a four digit key value.

A variety of mechanisms may be employed to obtain a four digit number from the user of paging device 18. It is suggested that one of the control buttons, e.g., 24a, be designated a "select" button, another one of the control buttons 24, e.g., 24b, be designated a "set" button. Pressing the select button causes display 22 to cycle through value options for a first digit of a proposed key value. Once the user establishes an appropriate value for this first digit, the set button is pressed to accept the selection and move to the next digit position. This process continues until the user has designated a four digit decryption key. Once the four digit key has been established, paging device 18 applies the four digit key, i.e.,loads it into register 62, and executes the decryption algorithm described above in connection with FIG. 3.

Figure 5:
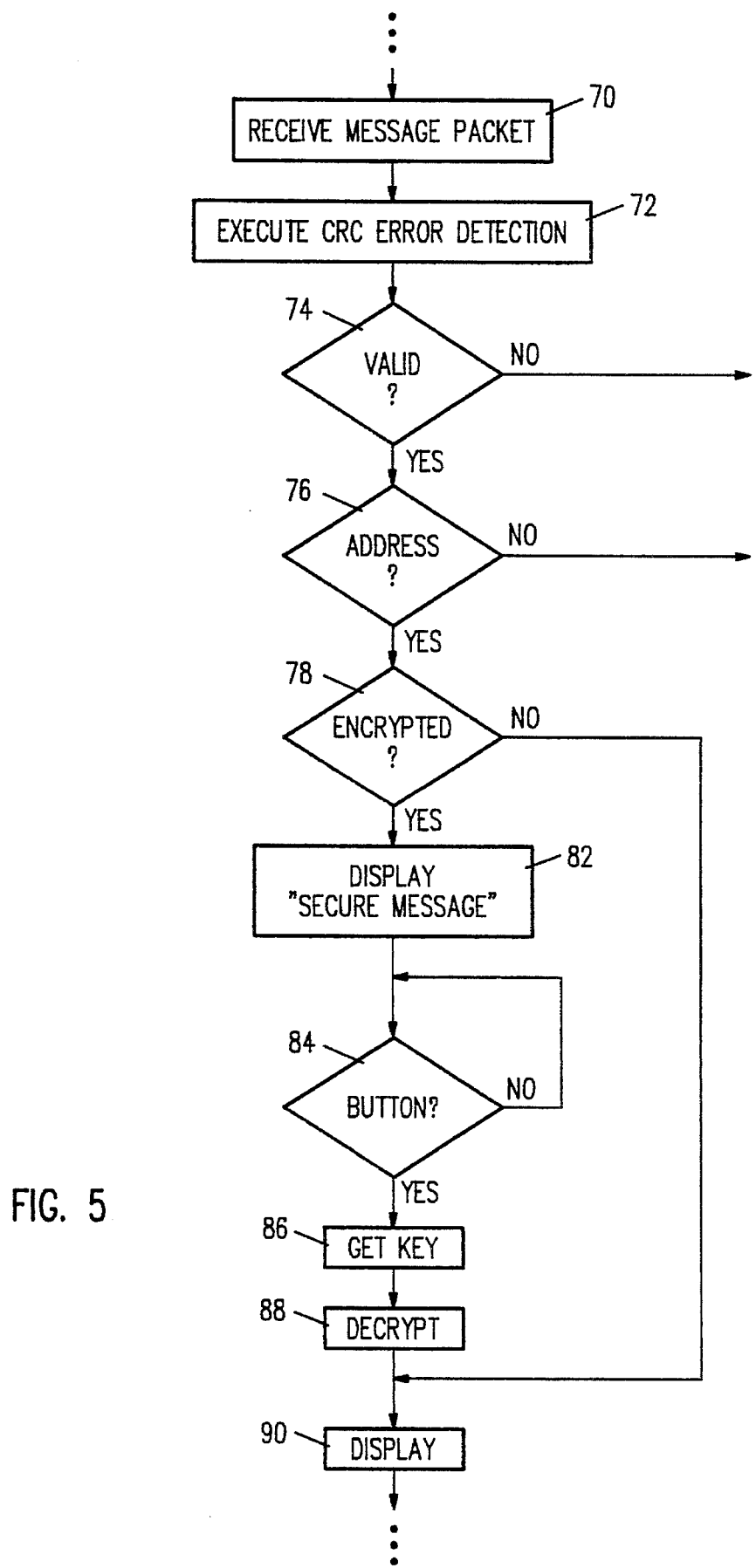
FIG. 5 illustrates a programming segment associated with collecting and presenting a secure message to the user of the paging device of FIG. 1.

FIG. 5 illustrates programming employed in paging device 18 corresponding to the process of message collection and processing. In FIG. 5, processing begins in block 70 where the paging device 18 activates its radio receiving circuitry and collects from radio signal 20 a message packet according to paging system 10 protocol. In block 72, paging device 18 executes appropriate CRC error detection by use of the hardware and software resource illustrated in FIG. 3. In particular, paging device 18 loads the received message 31b in register 64, loads register 62 with all zeroes, and executes the CRC check word calculation routine to fill the register 62 with a CRC check word. The calculated CRC check word is then compared to the CRC check word appended as a portion of message 31d to detect transmission errors in message packet 31. In decision block 74, if the message 31b is unrecoverably flawed, i.e., as indicated by the CRC error detection feature, then processing branches from decision block 74 to unrelated programming.

Continuing to decision block 76, the message packet 31 includes pager address 31a indicating whether the message packet is to be further processed by the particular paging device 18. If the address does not match the paging device 18 address, then processing branches at decision block 76 to unrelated programming. Otherwise, processing advances to decision block 78 where paging device 18 interrogates the encryption bit 31c of message packet 31 to determine whether the message need be decrypted. If the encryption bit 31c indicates a plaintext message, then processing advances directly to block 80 where the plaintext message is displayed. If, however, the encryption bit 31c indicates need for decryption, then processing advances to block 82. Processing in block 82 corresponds to presentation of the "secure message" screen of FIG. 4A. Processing then loops at decision block 84 until the user of paging device 18 presses one of buttons 24. Continuing to block 66, paging device 18 obtains from the user a decryption key as described in connection with FIG. 4B. In block 88, paging device 18 applies the decryption algorithm described above in connection with FIG. 3 to obtain a plaintext version of encrypted message 31b in register 64 of paging device 18.

Once the plaintext information is obtained, paging device 18 displays the plaintext message according to conventional operation in processing of block 90.

Thus, an improved method of providing information to a paging device has been shown and described. Under the method the present invention, paging messages may be secured prior to delivery to a paging system. In this manner, the paging system need not have access to encryption keys, thereby elevating message security within the paging system, especially when broadcast by radio signal. Furthermore, the method of the present invention proposes a dual function for given hardware and software resources of the paging devices, i.e., employing the same hardware or software for executing both error detecting algorithms and message decrypting algorithms.

It will be appreciated that the present invention is not restricted to the particular embodiment that has been described and illustrated, and that variations may be made therein without departing from the scope of the invention as found in the appended claims and equivalents thereof.

What is claimed is:

1. In a radio paging receiver which includes dual purpose circuitry, said dual purpose circuitry including a CRC generator, and a shift register which sequentially supplies bits to an output port, said CRC generator having an input and an output, the method comprising the steps of:

generating a CRC data word by feeding data from the output port of said shift register to the input of said CRC generator, and decoding data by loading said CRC generator with a first seed word, loading said shift register with a second seed word and exclusive ORing data from the output of said CRC generator with encrypted data.

2. A radio paging receiver which includes dual purpose circuitry, said dual purpose circuitry including a CRC generator, and a shift register which sequentially supplies bits to an output port, said CRC generator having an input and an output, said dual purpose circuitry being capable of performing both error correction and decryption, said dual purpose circuitry comprising, first means connecting said output port of said shift register to said input of said CRC generator to generate a CRC check number, second means performing an Exclusive OR operation between data at the output of said CRC generator and encrypted message data.

3. The device recited in claim 2 wherein said CRC generator comprises a plurality of shift registers connected by exclusive OR circuits.

4. In a radio paging receiver which includes dual purpose circuitry, said dual purpose circuitry including a CRC generator, and a shift register which sequentially supplies bits to an output port, said CRC generator having an input and an output, the method comprising the steps of:

generating a CRC check word by feeding data from the output port of said shift register to the input of said CRC generator, and decoding data by loading said CRC generator with a first seed word, loading said shift register with a second seed word and exclusive ORing data from the output of said CRC generator with encrypted data, whereby said CRC generator and said shift register are used both for generating a CRC check word and for decoding encrypted data.

* * * * *